United States Patent
Zou et al.

(10) Patent No.: US 8,922,491 B2
(45) Date of Patent: Dec. 30, 2014

(54) METHOD AND APPARATUS ENABLING KEYSTROKE ACCELERATION

(71) Applicant: Tencent Technology (Shenzhen) Company Limited, Guangdong (CN)

(72) Inventors: Difei Zou, Guangdong (CN); Xu Zhang, Guangdong (CN); Bin Lei, Guangdong (CN); Zhiyun Liu, Guangdong (CN); Chundong Hu, Guangdong (CN); Feng Wang, Guangdong (CN); Jie Bai, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/731,204

(22) Filed: Dec. 31, 2012

(65) Prior Publication Data

US 2013/0113708 A1 May 9, 2013

Related U.S. Application Data

(63) Continuation of application No. PCT/CN2011/076823, filed on Jul. 4, 2011.

(30) Foreign Application Priority Data

Jul. 8, 2010 (CN) .......................... 2010 1 0226687

(51) Int. Cl.
*G06F 3/02* (2006.01)
*H04M 1/725* (2006.01)
(Continued)

(52) U.S. Cl.
CPC ............... *G06F 3/02* (2013.01); *H04M 1/7258* (2013.01);
(Continued)

(58) Field of Classification Search
CPC .................. G06F 1/1662–1/1673; G06F 3/02; G06F 3/0205; G06F 3/023–3/0238; G06F 3/0426; G06F 3/0485; G06F 3/0489; G06F 3/04892

USPC ................... 345/156–184; 340/407.1–407.2; 341/22–34; 708/142–146
See application file for complete search history.

(56) References Cited

U.S. PATENT DOCUMENTS

| 5,495,566 A | 2/1996 | Kwatinetz |
| 2002/0075315 A1 | 6/2002 | Scott |

(Continued)

FOREIGN PATENT DOCUMENTS

| CN | 1486454 A | 3/2004 |
| CN | 1933642 A | 3/2007 |

(Continued)

OTHER PUBLICATIONS

"Decreasing Time Interval Method for Accelerating Keystroke Action", Jul. 1983, published in the IBM Technical Disclosure Bulletin, vol. 26, Issue 2, pp. 471-472.*

(Continued)

*Primary Examiner* — Liliana Cerullo
(74) *Attorney, Agent, or Firm* — Harness, Dickey & Pierce, P.L.C.

(57) ABSTRACT

A method enabling keystroke acceleration includes: receiving a signal indicating a key is kept pressing; obtaining a current acceleration start time; perform an operation corresponding to the key pressed when the current acceleration start time arrives, judging whether the key is still being pressed; performing the step of obtaining the current acceleration start time when the key is still being pressed. The apparatus includes: a receiving module, an obtaining module, a first processing module and a second processing module. According to the present invention, after a signal indicating a key is kept pressed, a current acceleration start time is obtained, and the keystroke is responded when the current acceleration start time arrives. Therefore, the user does not have to press a key repeatedly, and the key operation can be automatically performed, which reduces the number of keystrokes needed and makes the operation simpler and less time-consuming.

8 Claims, 4 Drawing Sheets

(51) Int. Cl.
*G06F 3/0489* (2013.01)
*G06F 3/0485* (2013.01)

(52) U.S. Cl.
CPC ........... *G06F 3/0489* (2013.01); *G06F 3/0485* (2013.01); *G06F 3/04892* (2013.01); *H04M 2250/12* (2013.01)
USPC ........................................................ 345/168

(56) References Cited

U.S. PATENT DOCUMENTS

| | | | |
|---|---|---|---|
| 2003/0231164 | A1 | 12/2003 | Blumer et al. |
| 2007/0109270 | A1* | 5/2007 | Kim et al. ..................... 345/169 |
| 2008/0227499 | A1* | 9/2008 | Suzuki et al. ................. 455/566 |
| 2009/0219304 | A1* | 9/2009 | Martin et al. ................. 345/684 |

FOREIGN PATENT DOCUMENTS

| | | | |
|---|---|---|---|
| CN | 101321342 | A | 12/2008 |
| JP | 02268312 | A | 11/1990 |
| JP | 4-205408 | A | 7/1992 |
| JP | 04273313 | A | 9/1992 |
| JP | 05011902 | A | 1/1993 |
| JP | 06189210 | A | 7/1994 |
| KR | 20080053304 | A | 6/2008 |

OTHER PUBLICATIONS

International Search Report: mailed Oct. 20, 2011; PCT/CN2011/076823.
First Chinese Office Action dated Jan. 31, 2013; Appln. No. 2010102266872.
Australian Patent Examination Report No. 1 dated Jan. 6, 2014; Appln. No. 2011276789.
Japanese Office Action dated Jan. 7, 2014; Appln. No. 2013-516987.
Korean Office Action dated Jan. 24, 2014; Appln. No. 10-2012-7033504.
Canadian Office Action for Application No. 2,803,460 dated Apr. 8, 2014.
IBM, and AS Murphy. "Decreasing TIME Interval Method for Accelerating Keystroke Action." IP.com Prior Art Database Technical Disclosure (1983): 1-3. Ip.com. Web.
Extended European Search Report for Application No. 11803144.2 dated May 6, 2014.
Australian Office Action for Application No. 2011276789, dated Aug. 13, 2014.
Korean Office Action for Application No. 10-2012-7033504, dated Jul. 24, 2014.

* cited by examiner

METHOD AND APPARATUS ENABLING KEYSTROKE ACCELERATION

FIELD OF THE INVENTION

The present invention relates to communications, and particularly to a method and an apparatus enabling keystroke acceleration.

BACKGROUND

Along with developments in communications technology, terminal devices are becoming more and more powerful. Besides making a phone call, one may also use a terminal device to browse content data such as news, documents and/or images. Currently, a user needs to press a key of a terminal device frequently to scroll content data displayed on a screen of the device to read the content when browsing the news, documents and/or images on the terminal device. For example, when a user wants to browse content which can be displayed using three screens with each screen displaying 15 lines of content and each keystroke on a down arrow button makes the content data scroll down for one line, the user has to press the down arrow button for at least ten times to finish browsing the whole content.

During the process of conceiving the present invention, the inventor found the conventional art has at least the following drawbacks.

According to the conventional art, a keystroke causes one movement of the content displayed on the terminal screen. When a large amount of content is to be browsed, the key needs to be pressed repeatedly for a lot of times.

SUMMARY

Embodiments of the present invention provide a method enabling keystroke acceleration to reduce the number of keystrokes needed for browsing content displayed on a terminal screen, thus make the operation much simpler and less time-consuming.

Embodiments of the present invention also provide a system enabling keystroke acceleration to reduce the number of keystrokes needed for browsing content displayed on a terminal screen, thus make the operation much simpler and less time-consuming.

In order to achieve the above objectives, the technical scheme of the present invention is as follows.

A method enabling keystroke acceleration may include:

A, receiving a signal indicating a key is kept pressed;

B, obtaining a current acceleration start time;

C, implementing a keystroke function in response to a determination that the current acceleration start time has arrived, and judging whether the key is still being pressed, and the procedure in step B is performed in response to a determination that the key is still being pressed.

An apparatus enabling keystroke acceleration may include:

a receiving module, configured to receive a signal indicating a key is kept pressed;

an obtaining module, configured to receive the signal from the receiving module and obtaining a current acceleration start time;

a first processing module, configured to implement a keystroke function in response to a determination that the current acceleration start time obtained by the obtaining module has arrived, and judge whether the key is still being pressed;

a second processing module, configured to instruct the obtaining module to obtain a current acceleration time in response to a determination that the key is still being pressed.

It can be seen from the above embodiments that a terminal may obtain a current acceleration time after receiving a signal indicating a key is kept pressed, and respond to the key pressed by performing an operation corresponding to the key when the current acceleration time arrives, thus the operation corresponding to the key can be automatically performed and the user does not have to press the key repeatedly. Therefore, the method and apparatus provided by the embodiments can reduce the number of keystrokes needed and make the operation simpler and less time-consuming.

BRIEF DESCRIPTION OF THE DRAWINGS

In order to make the technical schemes of the present invention clearer, drawings accompanying a few embodiments are hereinafter described briefly. The following drawings are merely some of the embodiments of the present invention. For those skilled in the art, other drawings can be obtained based on the following drawings without any inventive work done.

EMBODIMENTS

The present invention is hereinafter described in detail with reference to the accompanying drawings as well as embodiments so as to make the objective, technical solution and merits thereof more apparent. It should be noted that the embodiments are merely some of the embodiments of the present invention, not all of possible embodiments. Based on the embodiments of the present invention, other embodiments obtained by those skilled in the art without any inventive work done are still within the protection scope of the present invention.

Embodiment 1

Figure 1:
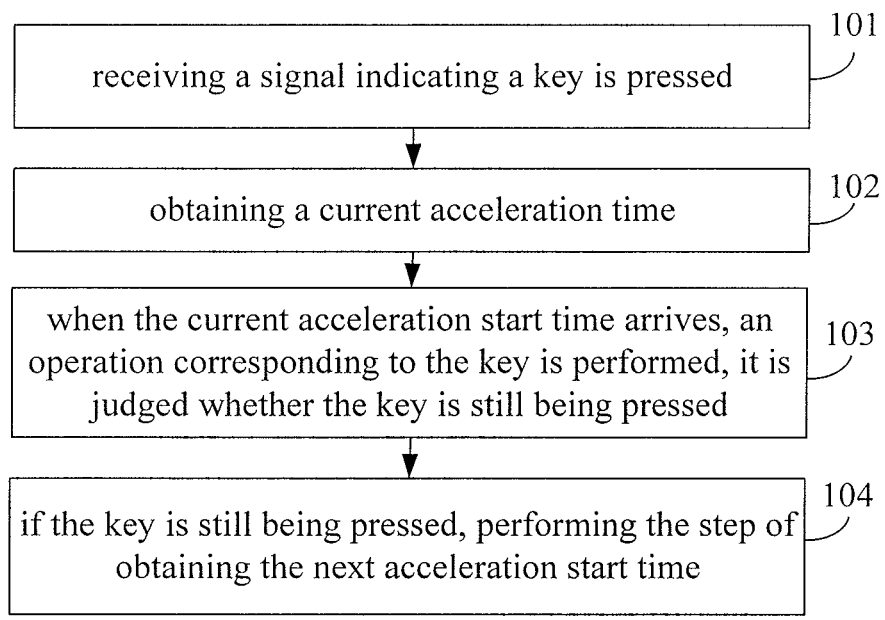
FIG. 1 is a flowchart illustrating a method enabling keystroke acceleration according to embodiment one of the present invention.

Referring to FIG. 1, an embodiment provides a method enabling keystroke acceleration, which may include the following procedures.

In block 101, a signal indicating a key is kept pressed is received.

In block 102, a current acceleration start time is obtained.

In block 103, when the current acceleration start time arrives, an operation corresponding to the key is performed, and it is judged whether the key is still being pressed.

In block 104, the procedure of obtaining a next acceleration start time, i.e. the procedure in block 102, is performed again in response to a determination that the key is still being pressed.

The method may also include the following procedure after the procedure of receiving the signal indicating the key is kept pressed and before obtaining the current acceleration start time:

judging whether there is an acceleration function for the key being pressed;

performing the procedure of obtaining the current acceleration start time in response to a determination that there is an acceleration function for the key being pressed.

Before performing the operation corresponding to the key, the method may also include:

judging whether the key being pressed is correct and/or the current interface is identical with the interface displayed when the key was initially pressed;

the procedure of performing the operation corresponding to the key is performed in response to a determination that the key being pressed is correct or a current interface is identical with an interface displayed when the key is pressed or the key being pressed is correct and a current interface is identical with an interface displayed when the key is pressed.

The procedure of obtaining the current acceleration time may include:

obtaining, from a pre-set acceleration array, an acceleration start time corresponding to the number of times an acceleration operation having been performed. The pre-set acceleration array may store multiple acceleration start times corresponding to different number of times of acceleration.

The procedure of obtaining the current acceleration time may include:

obtaining, from a pre-set acceleration array, an acceleration start time corresponding to the number of times the acceleration operation having been performed. The pre-set acceleration array may include multiple acceleration start time interval arranged in an ascending order or a descending order of time length. The acceleration start time interval corresponding to the current number of acceleration times may be larger than the acceleration start time interval corresponding to any subsequent acceleration.

It can be seen from the above embodiments that a current acceleration time is obtained after a signal indicating a key is kept pressed is received, the keystroke is responded and an operation corresponding to the key when the current acceleration time arrives, thus the operation corresponding to the key can be automatically performed and the user does not have to press the key repeatedly. Therefore, the number of keystrokes needed is reduced and the operation is made simpler and less time-consuming.

In an embodiment, the keystroke acceleration function is triggered selectively based on a judgment about whether there is an acceleration function for the key being pressed, which extends the application scope of the technical scheme. In another embodiment, keystroke acceleration functions can be implemented correctly through a judgment of whether the key being pressed is correct. In yet another embodiment, the keystroke acceleration function becomes more reliable through a judgment about whether the current interface is the same with the interface displayed when the key was initially pressed. The keystroke acceleration function may be performed again based on a judgment of whether the key pressed is still being pressed, thus the keystroke acceleration function can be performed more precisely.

In an embodiment, the current acceleration start time may be determined based on the number of times the acceleration operation has been performed, and different number of times may be corresponding to different acceleration start time, therefore, non-linear acceleration can be implemented, and the keystroke acceleration function can be performed with higher efficiency.

Figure 2:
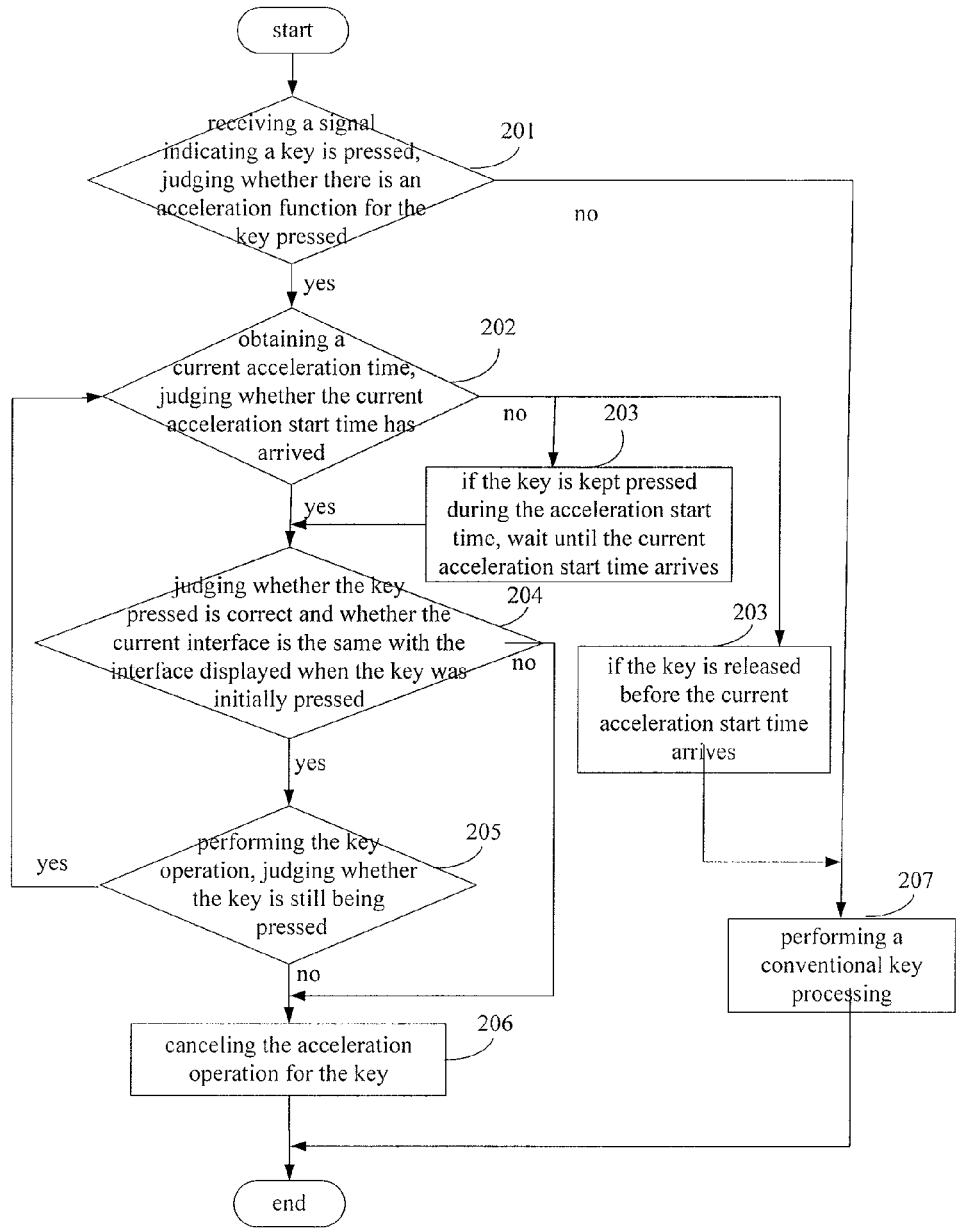
FIG. 2 is a flowchart illustrating a method enabling keystroke acceleration according to embodiment two of the present invention.

Embodiment 2:

As shown in FIG. 2, an embodiment provides a method enabling keystroke acceleration which may include the following procedures.

In block 201, a signal indicating a key is kept pressed is received, it is judged whether there is an acceleration function for the key pressed; the procedure in block 202 is performed in response to a determination that there is an acceleration function for the key pressed, and the procedure in block 207 is performed in response to a determination that there is no acceleration function for the key pressed.

When a user is browsing content data such as news, a document and/or images on a terminal such as a handset, a key having a proper acceleration function may be pressed. Acceleration functions for keys may be pre-configured in the terminal. Acceleration function refers to after a user pressing a key, the user keeps pressing the key instead of pressing the key repeatedly, thus causing the content data displayed on the screen to move automatically, etc. For simplicity, a key having acceleration function is also referred to as an acceleration key. An acceleration key may be configured according to practical situations. For example, according to the different directions of movements of content data, the following acceleration keys may be configured: a down acceleration key, i.e. a key for moving content data downwards; an up acceleration key, i.e. a key for moving content data upwards; a left acceleration key, i.e. a key for moving content data leftwards; and a right acceleration key, i.e. a key for moving content data rightwards, and so on. Various configurations may be adopted according to application scenarios, and are not limited in the present invention.

In block 202, a current acceleration start time is obtained, and it is judged whether the current acceleration start time has arrived; the procedure in block 204 is performed in response to a determination that the current acceleration start time has arrived, and the procedure in block 203 is performed in response to a determination that the current acceleration start time has not arrived.

The current acceleration start time is configured in the terminal, and refers to a time period after which an operation corresponding to the key being pressed is performed automatically. When the key operation is to be performed repeatedly for multiple times, the current acceleration start time may be regarded as the time interval between the two automatic implementations of the key operation. Each automatic implementation of the key operation may cause the content data to automatically scroll for one line or for one screen, and etc. The result of an automatic implementation of the key operation may be the same with that of the operation performed in response to a keystroke of the same key as defined in the terminal. For example, when it is configured in the terminal that each stroke on the key causes the content data to scroll for one line, an automatic implementation of the key operation also causes the content data to automatically scroll for one line. Therefore, the user only has to keep pressing the key after pressing the key to achieve the same effect with multiple strokes on the key, i.e., the content data can be scrolled automatically.

It should be noted that when the key operation is to be performed for multiple times, the time intervals between two automatic executions of the operation may be set to have descending length to improve the acceleration function experienced by the user. That is, the acceleration start time obtained each time according to the number of times the operation has been automatically implemented may be different, and an acceleration start time obtained later may be shorter than an acceleration time previously obtained. In an embodiment, the lengths of time intervals between two automatic executions of the operation may descend un-linearly, e.g., 8, 4, 2, 1. In an embodiment, the current acceleration start time may be obtained in the following manner:

pre-setting an acceleration data array which stores multiple acceleration start times corresponding to different number of times the acceleration has been performed, and the current acceleration start time is obtained from the pre-set acceleration data array based on the number of times the acceleration has been performed.

The number of acceleration start times set in the acceleration data array and the value of each acceleration start time may be set according to practical needs, and are not limited in the present invention.

According to research and test results, the time interval between two executions of the operation descending from 1000 ms to 400 ms, 100 ms, 50 ms, 50 ms, 50 ms, 50 ms may generate good effects. Therefore, in an embodiment, the acceleration time intervals stored in the acceleration data array in descending order may be 1000 ms, 400 ms, 100 ms, 50 ms, 50 ms, 50 ms, 50 ms. The acceleration time intervals may also be stored in the acceleration data array in ascending order as long as the acceleration time intervals are obtained in the descending order, i.e., the acceleration start time obtained previously is larger than the acceleration start time obtained subsequently.

When the key is still not released when the last acceleration start time in the acceleration data array has been obtained, further acceleration is needed. In this situation, acceleration start time for a subsequent acceleration may be set to be the last acceleration start time in the acceleration data array or a fixed value. This is not limited in the present invention, and may be set according to the needs.

The acceleration start time may be obtained in manners other than from a pre-set acceleration data array. In practice, any feasible approach may be used according to the needs, such as by pre-setting a function for implementing the descending and taking a value generated by the function as the current acceleration start time. When the time intervals between two automatic key operations are configured to be descending non-linearly, the function pre-set may be a quadratic function for implementing the descending.

In some embodiments, the time intervals between two key operations are descending, but in other embodiments, the time intervals may also be ascending or simply different, and this is not limited in the present invention.

In an embodiment, a timer may be set for determining whether the current acceleration start time has arrived, so as to achieve precise timing.

In block 203, the procedure in block 204 is not performed until the current acceleration start time has arrived when the key is kept pressed before it reaches the current acceleration start time; the procedure in block 207 is performed when the key is released before it reaches the current acceleration time.

In block 204, it is judged whether the key pressed is correct and whether the interface currently displayed is the same with the interface displayed when the key was initially pressed, the procedure in block 205 is performed when the key pressed is correct and the interface currently displayed is the same with the interface displayed when the key is pressed; otherwise, the procedure in block 206 is performed.

Judging whether the key pressed is correct refers to judging whether the key initially pressed is the same with the key being pressed when this procedure is performed. If the key is the same, the key pressed is correct; otherwise, the key pressed is incorrect.

For example, when the key pressed by the user in block 201 is the key "0" and the key being pressed in this procedure is the key "1", it is determined the key pressed is incorrect. In an embodiment, information of the key being pressed may be obtained in real time from a system event notification in the terminal, and the key is compared with the key pressed in block 201 to determine whether the key pressed is correct.

It is judged whether the current interface is the same with the interface displayed when the key was initially pressed, so as to avoid endless acceleration resulted from a jump from a primitive painted interface to a higher level interface so that a key release event can not be received. Therefore the reliability of keystroke acceleration can be improved by judging whether the current interface is the same with the interface displayed when the key is pressed, but this procedure is not necessary. In an embodiment, the step of judging whether the current interface is the same with the interface displayed when the key was initially pressed may not be performed, and instead, it is merely judged whether the key pressed is correct, and the procedure in block 205 is performed in response to a determination that the key pressed is correct.

Judging whether the key pressed is correct is for avoiding incorrect keystroke acceleration being performed in case of a quick change in the key pressed. The correctness of performing keystroke acceleration functions can be improved by judging whether the key pressed is correct, but this procedure is not necessary. In an embodiment, the step of judging whether the key pressed is correct is not performed, it is merely judged whether the current interface is the same with the interface displayed when the key was initially pressed, and the procedure in block 205 is performed in response to a determination that the current interface is the same with the interface displayed when the key is pressed.

In block 205, the key operation is performed, and it is judged whether the key pressed is still being pressed; the procedure in block 202 is performed in response to a determination that the key is still being pressed; the procedure in block 206 is performed in response to a determination that the key is not being pressed.

Each automatic implementation of the key operation may cause the content data to automatically scroll for one line or for one screen, and etc. The result of an automatic implementation of the key operation may be the same with that of the operation performed in response to a keystroke on the same key as defined in the terminal. For example, when it is configured in the terminal that each stroke on the key causes the content data to scroll for one line, an automatic implementation of the operation corresponding to the key also causes the content data to automatically scroll for one line. Therefore, the user only has to keep pressing the key after pressing the key to achieve the same effect with multiple strokes on the key, i.e., the content data can be scrolled automatically.

In block 206, acceleration for the key is canceled, and the process is ended.

In block 207, a conventional keystroke processing is performed and the process is ended.

It can be seen from the above embodiments that a current acceleration time is obtained after a signal indicating a key is pressed is received, the keystroke is responded and an operation corresponding to the key when the current acceleration time arrives, thus the operation corresponding to the key can be automatically performed and the user does not have to press the key repeatedly. Therefore, the number of keystrokes needed is reduced and the operation is made simpler and less time-consuming.

In an embodiment, the keystroke acceleration function is triggered selectively based on a judgment about whether there is an acceleration function for the key being pressed, which extends the application scope of the technical scheme. In another embodiment, keystroke acceleration functions can be implemented correctly through a judgment of whether the key being pressed is correct. In yet another embodiment, the keystroke acceleration function becomes more reliable through a judgment about whether the current interface is the same with the interface displayed when the key is pressed. The keystroke acceleration function may be performed again based on a judgment of whether the key pressed is still being pressed, thus the keystroke acceleration function can be performed more precisely.

In an embodiment, the current acceleration start time may be determined based on the number of times the acceleration operation has currently been performed, and different number of times may be corresponding to different acceleration start time, therefore, non-linear acceleration is implemented, and the keystroke acceleration function can be performed with higher efficiency.

Embodiment 3

Figure 3:
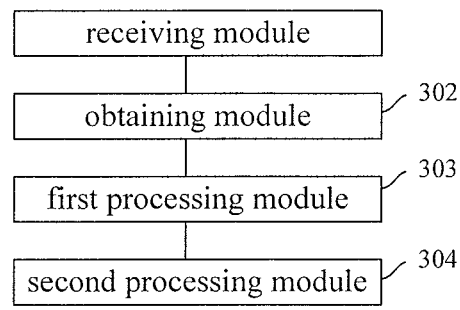
FIG. 3 is a block diagram illustrating a structure of an apparatus enabling keystroke acceleration according to embodiment three of the present invention.

As shown in FIG. 3, an embodiment provides an apparatus enabling keystroke acceleration which may include the following modules.

A receiving module 301 is configured to receive a signal indicating a key is kept pressed.

An obtaining module 302 is configured to receive the signal from the receiving module 301 and obtaining a current acceleration start time.

A first processing module 303 is configured to implement a keystroke function in response to a determination that the current acceleration start time obtained by the obtaining module has arrived, and judge whether the key is still being pressed.

A second processing module 304 is configured to instruct the obtaining module 302 to obtain a current acceleration time in response to a determination of the first processing module 303 that the key is still being pressed.

Figure 4:
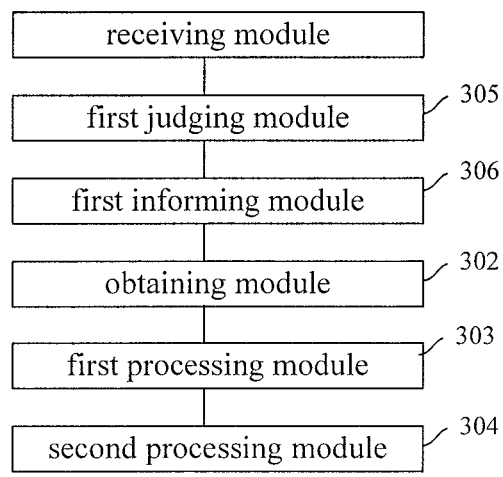
FIG. 4 is a block diagram illustrating another structure of an apparatus enabling keystroke acceleration according to embodiment three of the present invention.

Referring to FIG. 4, the apparatus may also include:

a first judging module 305, configured to judge whether there is an acceleration function for the key pressed after receiving the signal indicating the key is pressed from the receiving module 301;

a first informing module 306 is configured to instruct the obtaining module 302 to obtain a current acceleration time in response to a determination of the first judging module 305 that there is an acceleration function for the key pressed.

Figure 5:
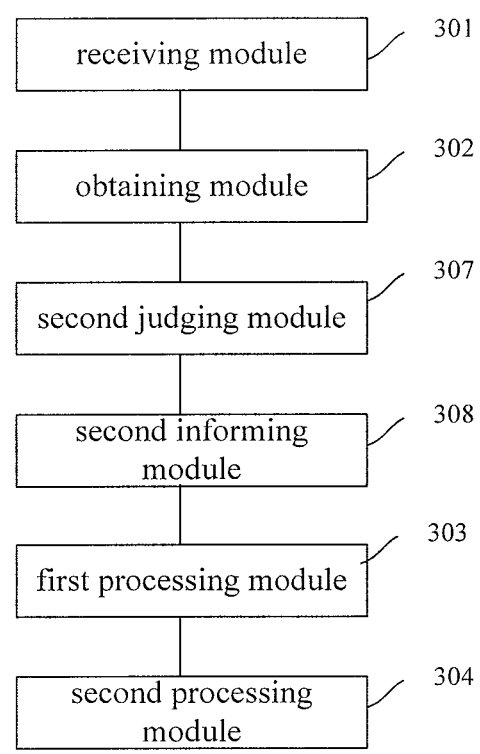
FIG. 5 is a block diagram illustrating yet another structure of an apparatus enabling keystroke acceleration according to embodiment three of the present invention.

Referring to FIG. 5, the apparatus may also include:

a second judging module 307, configured to judge whether the key pressed is correct and/or whether the current interface is the same with the interface displayed when the key was initially pressed when the current acceleration start time obtained by the obtaining module 302 has arrived;

a second informing module 308, configured to instruct the first processing module 303 to perform the operation corresponding to the key in response to a determination of the second judging module 307 that the key pressed is correct or that the current interface is the same with the interface displayed when the key was initially pressed or that the key pressed is correct and the current interface is the same with the interface displayed when the key was initially pressed.

The obtaining module 302 may include a first obtaining sub module which is configured to obtain an acceleration start time corresponding to the number of times the acceleration has been performed from a pre-set acceleration data array. The pre-set acceleration data array may store multiple acceleration start time.

The obtaining module 302 may include a second obtaining sub module which is configured to obtain an acceleration start time corresponding to the number of times the acceleration operation having been performed from a pre-set acceleration array. The pre-set acceleration array may include multiple acceleration start time arranged in an ascending order or descending order of time length. The acceleration start time corresponding to the current number of times of acceleration may be larger than the acceleration start time corresponding to any subsequent acceleration.

The apparatus enabling keystroke acceleration may be applied to terminals such as handsets to implement the acceleration function.

The apparatus enabling keystroke acceleration obtains a current acceleration time interval after receiving a signal indicating a key is pressed, responds to the keystroke and performs an operation corresponding to the key when the current acceleration time arrives, thus the operation corresponding to the key can be automatically performed and the user does not have to press the key repeatedly. Therefore, the number of keystrokes needed is reduced and the operation is made simpler and less time-consuming.

In an embodiment, the keystroke acceleration function is triggered selectively based on a judgment about whether there is an acceleration function for the key being pressed, which extends the application scope of the technical scheme. In another embodiment, keystroke acceleration functions can be implemented correctly through a judgment of whether the key being pressed is correct. In yet another embodiment, the keystroke acceleration function becomes more reliable through a judgment about whether the current interface is the same with the interface displayed when the key is pressed. The keystroke acceleration function may be performed again based on a judgment of whether the key pressed is still being pressed, thus the keystroke acceleration function can be performed more precisely.

In an embodiment, the current acceleration start time may be determined based on the number of times the acceleration operation has been performed, and different number of times may be corresponding to different acceleration start time, therefore, non-linear acceleration is implemented, and the keystroke acceleration function can be performed with higher efficiency.

Technical schemes of embodiments of the present invention may be partly or totally implemented by software programs. The software program may be stored in an accessible storage medium such as a hard drive, a compact disk or a floppy disk in a computer.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method enabling keystroke acceleration, comprising:
receiving a signal indicating a key is kept pressed;
obtaining a first time delay from a pre-defined array which stores plural time delays, wherein each of the plural time delays corresponds to an index value which represents the number of times an operation defined by the key has been performed, and lengths of the time delays descend as the index value increases;

judging after the first time delay whether a first user interface currently displayed is the same with a second user interface displayed when the key was initially pressed;

performing the operation defined by the key in response to a determination that the first user interface is the same with the second user interface, making a counter count the number of times the operation defined by the key has been performed, and determining whether the key is still being pressed, and in response to a determination that the key is still being pressed, taking a second time delay from the array which corresponds to an index value equivalent to a current counting value of the counter as the first time delay and executing the judging and the performing.

2. The method of claim 1, further comprising:

judging whether there is an acceleration function for the key pressed, and performing the procedure of obtaining the first time delay in response to a determination that there is an acceleration function for the key pressed.

3. An apparatus enabling keystroke acceleration, comprising:

a receiving module configured to receive a signal indicating a key is kept pressed;

an obtaining module configured to receive the signal from the receiving module, obtain a first time delay from a pre-defined array of plural time delays arranged in a descending order of lengths of the time delays, and provide the first time delay for a judging module;

the judging module configured to judge after the first time delay whether a first user interface currently displayed is the same with a second user interface displayed when the key was initially pressed;

an informing module configured to instruct a first processing module to perform an operation in response to a determination of the judging module that the first user interface is the same with the second user interface;

the first processing module configured to perform the operation defined by the key and judging whether the key is still being pressed; and a second processing module configured to instruct the obtaining module to obtain a second time delay which is the next time delay of the first time delay in the array in response to a determination of the first processing module that the key is still being pressed, update the first time delay with the second time delay and provide the first time delay for the judging module.

4. The apparatus of claim 3, further comprising:

a second judging module, configured to judge whether there is an acceleration function for the key pressed after receiving the signal indicating the key is pressed from the receiving module;

a second informing module, configured to instruct the obtaining module to obtain the first time delay in response to a determination of the second judging module that there is an acceleration function for the key pressed.

5. An apparatus enabling keystroke acceleration, comprising:

a receiving module configured to receive a signal indicating a key is kept pressed;

an obtaining module configured to receive the signal from the receiving module, obtain a first time delay from a pre-defined array which stores plural time delays, and provide the first time delay for a judging module, wherein each of the plural time delays corresponds to an index value which represents the number of times an operation defined by the key has been performed, and lengths of the time delays descend as the index value increases;

the judging module configured to determine after the first time delay whether a first user interface currently displayed is the same with a second user interface displayed when the key was initially pressed;

an informing module configured to instruct a first processing module to execute a performing operation in response to a determination of the judging module that the first user interface is the same with the second user interface;

the first processing module configured to execute the performing operation, the performing the operation defined by the key, making a counter count the number of times the operation defined by the key has been performed, and judging whether the key is still being pressed;

a second processing module configured to instruct the obtaining module to obtain a second time delay from the array which corresponds to a current counting value of the counter in response to a determination that the key is still being pressed, update the first time delay with the second time delay and provide the first time delay for the judging module.

6. The apparatus of claim 5, further comprising:

a second judging module, configured to judge whether there is an acceleration function for the key pressed after receiving the signal indicating the key is pressed from the receiving module;

a second informing module, configured to instruct the obtaining module to obtain the first time delay in response to a determination of the second judging module that there is an acceleration function for the key pressed.

7. A method enabling keystroke acceleration, comprising:

receiving a signal indicating a key is kept pressed;

obtaining a first time delay from a pre-defined array of plural time delays arranged in a descending order of lengths of the time delays;

judging after the first time delay whether a first user interface currently displayed is the same with a second user interface displayed when the key was initially pressed;

performing an operation defined by the key in response to a determination that the first user interface is the same with the second user interface, and judging whether the key is still being pressed, and in response to a determination that the key is still being pressed, taking a second time delay which is the next time delay of the first time delay in the array as the first time delay and executing the judging and the performing.

8. The method of claim 7, further comprising:

judging whether there is an acceleration function for the key pressed, and performing the procedure of obtaining the first time delay in response to a determination that there is an acceleration function for the key pressed.

* * * * *